United States Patent [19]

Carlin et al.

[11] 3,922,231

[45] Nov. 25, 1975

[54] PROCESS FOR THE RECOVERY OF FISSION PRODUCTS FROM WASTE SOLUTIONS UTILIZING CONTROLLED CATHODIC POTENTIAL ELECTROLYSIS

[75] Inventors: William W. Carlin, Portland; William B. Darlington, Corpus Christi, both of Tex.

[73] Assignee: PPG Industries, Inc., Pittsburgh, Pa.

[22] Filed: Nov. 24, 1972

[21] Appl. No.: 309,015

[52] U.S. Cl............. 252/301.1 W; 204/1.5; 204/105; 204/109; 252/301.1 R; 423/2; 423/6; 423/7; 423/22; 423/49
[51] Int. Cl.............................................. C02c 5/14
[58] Field of Search............. 252/301.1 R, 301.1 W; 423/2, 22, 49; 463/6, 7; 204/1.5, 105, 109

[56] References Cited
UNITED STATES PATENTS

| | | | |
|---|---|---|---|
| 2,832,727 | 4/1958 | Kunin | 204/1.5 |
| 2,895,889 | 7/1959 | Schumpelt | 204/47 |
| 2,990,240 | 6/1961 | Ellison et al. | 423/10 |
| 3,309,292 | 3/1967 | Andrews et al. | 204/39 |
| 3,374,157 | 3/1968 | Box | 204/45 R |
| 3,672,875 | 6/1972 | MacCragh | 252/301.1 R X |
| 3,708,508 | 1/1973 | Schulz | 423/22 X |

OTHER PUBLICATIONS

Stevenson, Progress in Nuclear Energy, Process Chemistry, Vol. 4, 1970, Pergamon Press, pp. 645–665.
Lingane, Electroanalytical Chemistry, 2d ed., 1958, Interscience Publishers, Inc. pp. 416–420.
Korkisch, "Modern Methods for the Separation of Raier Metal Ions", 3/1970, pp. 507–08, 512–513, 520–521.

*Primary Examiner*—Benjamin R. Padgett
*Assistant Examiner*—R. E. Schafer
*Attorney, Agent, or Firm*—Irwin M. Stein

[57] ABSTRACT

Fission products, e.g., palladium, rhodium and technetium, are recovered from aqueous waste solutions thereof, e.g., aged Purex alkaline waste solutions. The metal values from the waste solutions are extracted by ion exchange techniques. The metals adsorbed by the ion exchange resin are eluted and selectively recovered by controlled cathodic potential electrolysis. The metal values deposited on the cathode are recovered and, if desired, further purified.

18 Claims, 1 Drawing Figure

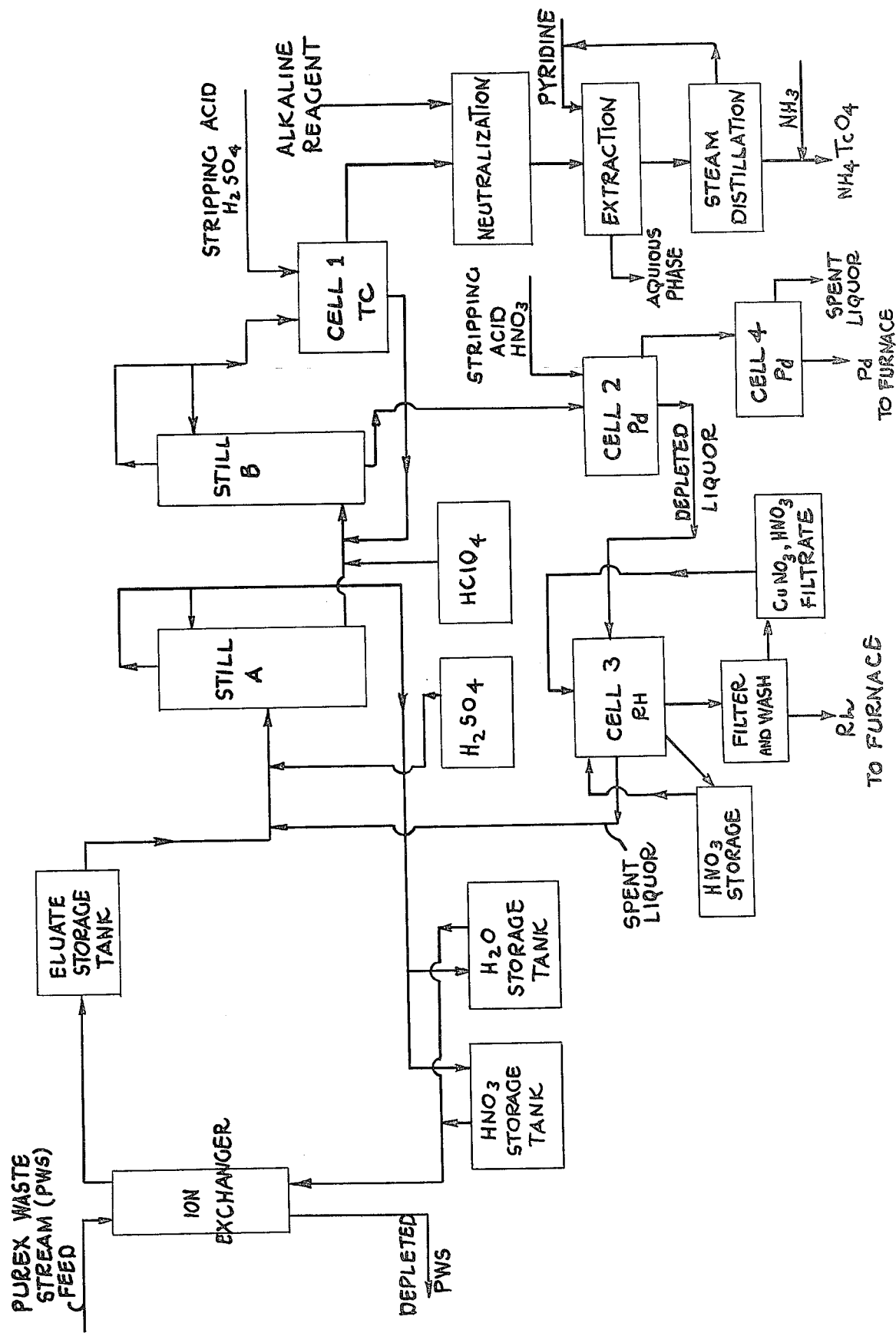

PROCESS FOR THE RECOVERY OF FISSION PRODUCTS FROM WASTE SOLUTIONS UTILIZING CONTROLLED CATHODIC POTENTIAL ELECTROLYSIS

DESCRIPTION

The present invention relates to the treatment of aqueous solutions containing fission products, most notably, aqueous waste solutions containing fission products obtained in processing neutron-irradiated uranium-containing fuel elements. More particularly, this invention relates to a process for the separation and recovery of palladium, rhodium and technetium from aged Purex alkaline waste solutions containing same.

In the conventional operation of uranium-fuel nuclear reactors, it is necessary to reprocess the reactor fuel element periodically to decontaminate and purify it in order to sustain continued operation. In the fission reaction, an atom of fissionable uranium isotope, upon absorbing a neutron, splits, thereby forming at least two smaller atoms, and, in addition, emits a plurality of neutrons which course through the fuel element where they are subject to being absorbed by another atom of fissionable uranium isotope so as to induce fission thereof and thus propagate the chain reaction. The smaller atoms resulting from the splitting action together with their radioactive decay products are termed "fission products". These fission products comprise isotopes having atomic numbers ranging predominantly from 30 to 63 and largely remain intimately dispersed and entrapped within the fuel element. Among such products are those which markedly interfere with the chain fission reaction. Characteristically, such species are highly neutron-absorptive and thus deleteriously serve to intercept and drain away neutrons so as to attenuate the further propagation of the chain fission reaction. Consequently, continued operation requires that the concentration of such fission products within the reactor be kept at a very low level. Accordingly, a fuel element, upon attaining enough relative fission product concentration is customarily discharged from the reactor to be processed for elimination of the fission product contamination and isolation and recovery of the remaining bulk of uranium.

One such process is known as the Purex process which is fully described in U.S. Pat. No. 2,990,240, issued June 27, 1961, in the names of Charles N. Ellison and Thomas C. Runion and entitled PROCESS FOR SEGREGATING URANIUM FROM PLUTONIUM AND FISSION PRODUCT CONTAMINATION. In the Purex process, fuel elements from nuclear reactors are dissolved in nitric acid. The plutonium, uranium and neptunium therein are recovered by tri-n-butyl phosphate solvent extraction leaving the majority of fission products, including palladium, rhodium and technetium, in the acidic aqueous wastes, which is termed Purex acid wastes (PAW). The process produces approximately 1500 gallons of liquid radioactive waste material per ton of uranium reprocessed. The Purex acid wastes are neutralized with sodium carbonate and stored in large underground tanks designed to contain this self-boiling, highly radioactive solution. After 4 to 5 years of storage, the radioactivity diminishes to the point where the solution becomes non-boiling. The majority of fission products settle to the bottom of the tank in a layer of sludge. The supernatant aqueous phase contains most of the cesium, strontium, rhodium, palladium, ruthenium and technetium in solution. The highly radioactive cesium and strontium are selectively removed from the supernatant leaving, in solution, salts of rhodium, palladium, technetium, ruthenium, sodium and low levels of other fission products. Among the radioactive isotopes present in the supernatant are believed to be radioactive isotopes, such as cesium $^{137}$, strontium $^{90}$, ruthenium $^{106}$, antimony $^{125}$, palladium $^{107}$, rhodium $^{102}$ and cobalt $^{60}$. The supernatant aqueous phase has gravity of specific gravity of about 1.2 due to a high concentration of nitrite, nitrate, carbonate and sulfate salts of sodium, and has a pH of from about 11 to 12. This supernatant is customarily termed aged alkaline "Purex wastes" (PWS).

The aged alkaline Purex supernatant waste contains ruthenium, palladium, rhodium and technetium at a parts per million level. However, because of the large volume of supernatant waste produced in the reprocessing of nuclear fuel elements, the amount of these metals present in the supernatant is significant. It has been estimated that by 1980, more rhodium per year will be made by the nuclear industry than will be consumed in the United States. Technetium is not found naturally in nature and is produced to date only by the aforementioned fission process or by neutron irradiation of molybdenum. See, for example, U.S. Pat. No. 3,382,152. Rhodium and palladium are rare in nature; and, thus, the potential value of the aforesaid precious metals in the supernatant is high.

It has now been discovered that palladium, rhodium and technetium can be recovered from aqueous alkaline waste solutions of fission products by a combined series of physical, chemical and electrolytic steps. The process is self-contained, efficient and manageable. Briefly, the aforesaid process comprises extracting palladium, rhodium and technetium values from the waste solution by anion exchange techniques. The metals adsorbed by the ion exchange resin are eluted and acidic solutions thereof subjected to controlled cathodic potential electrolysis in an electrolytic cell. The metal deposited on the cathode is removed and the metal further refined, if desired. While the present invention is described with particular reference to the treatment of aged Purex alkaline wastes, it is equally applicable to any aqueous alkaline solution containing fission products in small concentrations. Such solutions can be produced by other spent fuel reprocessing techniques such as the Redox process.

BRIEF DESCRIPTION OF THE DRAWING

The attached drawing is an abbreviated flow diagram of one embodiment of the recovery process of the present invention.

DETAILED DESCRIPTION

In accordance with the invention and with reference to the flow diagram of the drawing, an aqueous alkaline solution of fission products, e.g., aged alkaline Purex wastes (PWS) are intimately contacted with anion removal material, e.g., an anion exchange resin, whereby metal values therein are adsorbed by the anion removal material. Palladium, rhodium and technetium are present in the PWS as anionic species and, therefore, are removed therefrom by an anion removal material. Cesium, ruthenium, strontium and cobalt exist in the PWS as cationic species and are not removed by the anion removal material. Typically, at least 95 percent of the radioactive ruthenium, cesium, strontium and cobalt in the PWS is unadsorbed by the anion removal material, thereby reducing significantly the radioactivity level of the adsorbate. The relative concentration of fission products in the aqueous alkaline waste stream is not critical since the ion exchange resin will adsorb anionic species up to its capacity, i.e., its breakthrough point. Further, the relative concentration of fission products in the waste stream will depend on the type of fuel element irradiated and reprocessed, e.g., uranium $^{235}$, uranium $^{233}$, plutonium $^{239}$, the period of time the fuel element is in service, and the specific fuel reprocessing method used. Typically, such aqueous waste streams contain palladium, rhodium, ruthenium and technetium at low concentrations. For example, the concentrations of palladium, rhodium, ruthenium and technetium in aged alkaline Purex waste streams have been reported within the range of from 2 to 20 milligrams per liter.

The particular method of contacting the anion removal material with the PWS or the specific nature of the anion removal material are not critical to the practice of the present invention. Known adsorption (ion exchange) and elution techniques utilizing conventional ion exchange equipment and anion exchange materials can be employed. In a preferred embodiment, the anion removal material is disposed as a bed in an elongated vertical column and PWS is passed through the column.

The anion removal material used in the present recovery process should be relatively insoluble in water, dilute acids or dilute bases, capable of being regenerated and, preferably, have physical properties that permit its use in the form of a bed of granules. Liquid anion exchange materials can, however, be employed. Typical anion exchange materials that can be used in the present recovery scheme include Dowex A-1 and Dowex-2 synthetic ion exchange resins, which are strong base quaternary amine type anion exchange resins and which are described in the May, 1951 issue of "Industrial Engineering Chemistry", Volume 43, pages 1088 and 1089. Chemical and physical properties of similar suitable strong base anion exchange materials are further described in "Ion Exchange", by F. C. Nachod, published by Academic Press Inc., New York, N. Y., (1949), and "Ion Exchangers in Analytic Chemistry", by Olaf Samuelson, published by Wiley & Sons, Inc., New York, N.Y., (1953). Other anion exchange resins that are useful in the present process are Permutit SK ion exchange resin, which is a strong base pyridinium quaternary amine resin available from The Permutit Co., and Amberlite-IRA-938 ion exchange resin which is available from the Rohm and Haas Company. The above materials have been cited only as examples of suitable anion exchange materials since other equivalent materials which possess the necessary inertness to the strong reagents employed in the adsorption and elution portion of the process may be expected to behave similarly. Generally speaking, strong base anion exchange resins produce the best results.

Typically, the anion exchange resin is packed into a column through which the liquid PWS feed is passed. The column can be either vertical or horizontal, but, preferably, the column is disposed vertically. Further, the PWS feed can flow through the column in either direction, e.g., downwardly or upwardly. The flow of the PWS feed should be sufficiently slow to allow the adsorption of the precious metal anionic specie on the column, and the column should be long enough to obtain the percentage metal removal desired at the feed flow rate selected. Typically, feed flow rates of from 0.3 to 4 gallons per minute per square foot of bed area (gpm/ft$^2$) are adequate. Preferably, feed flow rates are below 4 gpm/ft$^2$ and, most preferably, are below 1 gpm/ft$^2$. The temperature and pressure at which the ion exchange is conducted is not critical. Customarily, ambient temperatures and pressures are used. If the flow of PWS through the column is other than downward, a back pressure at least sufficient to force the liquid feed through the column should be used.

When all of the available exchange sites on the resin are filled with adsorbed anions, the resin loses its ability to remove additional anions and the fission product metal anion concentration in the column effluent will rapidly increase to a value approaching their concentration in the column feed. The point at which the effluent begins to show this increse in concentration is termed the "breakthrough point".

The number of ion exchange columns used in the present recovery process is not critical since as soon as the column breakthrough point is reached, the feed to the column can be halted and the column regenerated. However, preferably at least three ion exchange columns are employed — two columns in series being used to extract fission product metal values from the PWS feed (the second column acting as a backup to the first column until the breakthrough point in the first column is achieved), while the third column is being regenerated. While at least three columns are preferred, any number can be used in series or parallel.

The processed PWS which is now depleted significantly of the fission product metal content present therein as anionic species is returned to the fuel reprocessor. The character of the depleted PWS stream is not significantly changed so no additional processing is required by the fuel reprocessor because of the ion exchange step of the present process.

Following the aforementioned adsorption step, the metal values adsorbed on the resin are removed therefrom and the resin regenerated in a desorption step. In the desorption step, the loaded anion exchange resin is customarily first washed with water, usually distilled water, followed by washing with a weak solution of the eluting agent. These effluents are discarded with the depleted PWS stream. After washing, the loaded anion exchange resin is regenerated by passing more concentrated solutions of the eluting agent through the column. In this manner, metal anionic species adsorbed by the resin are substantially removed from it.

Among the eluting agents that can be used in the present process, alone or in combination, there can be mentioned nitric acid, perchloric acid, sodium perchlorate, ammonium hydroxide, sodium hydroxide, and ammonium thiocyanate. Nitric acid is a preferred eluting agent.

Sulfuric acid and hydrochloric acid are not particularly suitable for elution and regeneration of the anion exchange resin because it is believed that they cause the loaded metal species to become adsorbed irreversibly on the resin by forming strong metal anionic complexes that are difficult to elute. Alkaline eluting agents, such as ammonium hydroxide, sodium hydroxide and ammonium thiocyanate, while aiding the elution of palladium, are not particularly effective as eluting agents for rhodium and technetium.

Typically, elution of the adsorbed anionic species from the anion exchange resin is achieved by intimately contacting the resin sequentially with increasing concentrations of eluting agent, e.g., nitric acid, followed by washing the resin with water to remove any remnant of eluting agent from the resin. A typical wash-elution-wash cycle might include: washing with water — bed volumes (BV), 0.1 molar (M) $HNO_3$ — 2 BV, 0.25 M $HNO_3$ — 1 BV, 3 M $HNO_3$ — 2 BV, 6 M $HNO_3$ — 9 M $HNO_3$ — 1 BV, and wash water — 2 BV.

The direction of flow of eluting agent through the column can be the same (co-current) as the direction of PWS feed through the column or it can be in the opposite direction (countercurrent) to the direction of the PWS feed through the column. Either direction can be used; however, when nitric acid is used as the eluting agent, countercurrent flow is preferred. The temperature and pressure used for the desorption step will generally be the same as that used for the adsorption step.

It has been observed that nitric acid removes the rhodium and technetium species adsorbed on the ion exchange column substantially quantitatively and removes from about 30 to 90 percent of the adsorbed palladium species depending on such variables as residence time on the resin and elution procedure. The palladium left on the resin can be removed by the use of perchloric acid, or any of the aforementioned alkaline materials. Usually, this residue of palladium is left on the resin until the resin is spent and is scheduled for disposal. It should be understood that while the above-recited elution sequence describes the use of nitric acid as the eluting agent, combinations of the above-described acid and base eluting agents can be used.

The adsorption - desorption cycle is performed repeatedly until the anion exchange resin becomes spent, i.e., loses its adsorptive capacity. This generally occurs after about 20 to 25 cycles. The metal species, i.e., principally palladium, remaining on the spent resin can be recovered by elution with perchloric acid, ammonium hydroxide, ammonium thiocyanate or combinations thereof. Alternatively, the resin can be dissolved in a mixture of sulfuric and nitric acids and the metal salts in the resulting acid solution recovered by sequential electrodeposition at different voltage levels by controlled potential electrolysis, as discussed in more detail hereinafter. The metal depleted acid solution can be returned to the fuel reprocessor along with the depleted PWS stream.

The total volume of ion exchange regeneration liquor (eluate) from the desorption step is combined in a storage tank. The eluate, based on the above-described elution cycle, is a nitric acid solution of approximately 5 molar and is forwarded to distillation column (still) A where water and nitric acid are recovered by distilling the eluate. The size and construction of still A is not critical; however, the materials of construction should, of course, be resistant to the acidic character of the eluate. For example, a glass lined still can be used. The separation of nitric acid from the eluate is not a critical distillation and, typically, a column containing one to two plates or several feet of packing can be used. The still can be equipped with the conventional auxiliary reflux, condensing and heating apparatus. The distillation of nitric acid is normally accomplished at atmospheric pressure; however, superatmospheric or subatmospheric pressures can be employed if desired.

Although nitric acid is a good eluting agent, it is not the best electrolyzing medium for the recovery of rhodium, palladium and technetium by controlled cathodic deposition. It has been found that the electrolysis is improved when sulfate or perchlorate anion is present in the electrolyte. Therefore, in accordance with the present recovery scheme, the nitrate anion in the eluate is replaced with either sulfate or perchlorate anion by the addition to the eluate of the corresponding inorganic acid. Sulfuric acid is economically preferred.

In carrying out the distillation in still A, heat is applied to the column, which is at atmospheric pressure, until a head temperature of about 100° C. is attained. At this temperature, water is the principal distillate and, as shown in the accompanying flow diagram, is forwarded to a water storage tank from where it can be drawn and used as wash water or to prepare specific concentrations of nitric acid for regeneration of the ion exchange resin. After a substantial portion of the water is removed from the column, the head temperature rises to about 120° C. at which temperature nitric acid distills. At this point and well in advance of dryness, i.e., while there is still sufficient liquid in the still pot, sulfuric acid, preferably concentrated sulfuric acid (98 weight percent), is added to the still in amounts sufficient to maintain the metals in the remaining eluate in solution. The addition of sulfuric acid to the still pot prevents insoluble rhodium compounds from forming when the nitric acid is removed. The head temperature of the still is then allowed to rise to about 125° C. to remove substantially all of the nitric acid from the still. The pot temperature can be allowed to increase to as high as about 320° C., i.e., about 10° below the boiling point of sulfuric acid. About 94 percent of the nitric acid in the eluate is recovered by this method; therefore, only about 6 percent of the nitric acid used for elution is required for makeup. The nitric acid distillate is forwarded to a nitric acid storage tank from where it can be drawn for re-use as the eluting agent in the desorption step.

The above-described sulfuric acid replacement of the nitric acid medium in the eluate is described as a batch process. It is, however, possible to make that replacement on a continuous basis by continuously removing water at the top of the column, concentrating and continuously removing the nitric acid about the midpoint of the column, and continuously adding sulfuric acid to the still below the column midpoint, while removing from the still a portion of the sulfuric acid concentrate as a bottoms cut. Further, while one distillation column has been described, it is obvious that concentration of the nitric acid in the eluate can be accomplished in one column and substitution of sulfuric acid for the nitric acid in the eluate can be accomplished in another column.

Referring to the accompanying flow drawing, the pot residue (bottoms) of still A, which is most likely a sulfuric acid solution of the salts of palladium, rhodium, ruthenium and technetium and the other metals present in the eluate, is withdrawn from still A and introduced into still B. In this distillation column, technetium and ruthenium are separated from palladium and rhodium. In accordance with the present process, this separation is accomplished by oxidizing the technetium and ruthenium to their respective volatile oxides and distilling these oxides from the distillation column.

The construction and operation of still B also is not critical to the present invention since such distillations can be performed by persons skilled in the art. Naturally, the materials of construction for still B should be resistant to the acidic character of the feed to the column and to the temperatures and pressures prevailing therein. A glass lined column can, for example, be used. Still B can be either a column with one or two plates or several feet of packing. The distillation can be accomplished at atmospheric pressure and, preferably, should be at the same pressure as that at which still A is operated.

In conducting the separation of technetium and ruthenium from the sulfuric acid solution in still B (most notably a separation from palladium and rhodium salts), a strong oxidizing agent is introduced into the solution to oxidize the technetium and ruthenium to their respective volatile oxides. Any of the well known strong oxidizing agents can be used for this purpose. As examples thereof, there can be mentioned perchloric acid, sodium dichromate, potassium permanganate and sodium bismuthate. In accordance with the flow diagram, perchloric acid, usually 70 percent perchloric acid, is added in a quantity sufficient to oxidize all of the technetium and ruthenium present in the sulfuric acid solution in still B to their volatile oxides. Heat is then applied to the still to distill over perchloric acid and the volatile oxides of ruthenium and technetium while retaining palladium and rhodium in the still as a sulfuric acid solution. Heating is continued until sulfuric acid fumes are formed. This will normally occur at a pot temperature of from about 330°–345° C. At this temperature, substantially all of the perchloric acid in the still has been distilled. Like still A, still B is adapted for distillate reflux for efficient fractionation, as well as with conventional auxiliary condensing and heating apparatus. The vaporous overhead from still B is condensed and the distillate, which comprises a solution of ruthenium and technetium in perchloric acid is forwarded to electrolytic cell 1. In this cell, the solution is subjected to an electrolyzing current under conditions of controlled cathode potential to deposit technetium metal on the cell cathode.

While the separation of technetium and ruthenium from rhodium and palladium is described and shown as being accomplished in a separate distillation column, it is obvious that in a batch process, the separation can be accomplished in the same distillation column, i.e., still A, in which the recovery of nitric acid and water from the eluate is accomplished. Further, while the separation of technetium and ruthenium from palladium and rhodium is accomplished herein by taking advantage of the volatility of the oxides of the first two mentioned metals, the separation of technetium can also be accomplished by neutralizing the sulfuric acid solution in still A with an alkaline reagent, such as ammonia, until an insoluble technetium salt, such as ammonium pertechnetate is precipitated. The precipitate is recovered by filtration and washed. The next preceding procedure requires reacidification of the filtrate in order to recover electrolytically the palladium and rhodium salts and redissolving the precipitated technetium salt in acid for electrolytic purification and recovery. Thus, this particular procedure is not economically desirable.

Electrolytic cell 1, wherein technetium is recovered, as well as electrolytic cells 2 and 3, wherein palladium and rhodium are recovered respectively, can be any conventional electrolytic cell containing fixed anodes and cathodes, as distinguished from electrolytic cells employing a flowing, e.g., mercury, cathode or anode. The cell housing should be constructed out of materials that are resistant or inert to the electrolyte as well as the gases discharged, if any, at the anode and cathode. Examples of materials of construction for the cell housing include: polyvinyl chloride, polyvinylidene chloride, glass, polytetrafluoroethylene, polyvinylidene fluoride and titanium. Typically, the cell housing contains stand pipes on the anode and cathode sides of the cell to remove any oxygen and hydrogen formed thereat respectively. Such gases are passed through absolute filters before being vented to the atmosphere. Naturally, the cell housing is equipped with feed inlet and discharge lines. Preferably, the discharge line is located opposite the inlet port. While the electrolysis is preferably conducted at ambient or room temperatures, the cell can be equipped with a thermoregulator and heater to regulate the temperature of the electrolyte.

It is to be understood that although one cell assembly is indicated in the flow diagram for recovery of each of the metals, technetium, palladium and rhodium, a plurality of cells in series or disposed in a single unitary housing or box can be used. The size, configuration and number of cathodes in the electrolytic cells described herein are a function of their design and are not critical to the present invention. The cathode should be designed in a manner so that sufficient cathode surface area is provided in the cell to plate substantially all of the particular metal being recovered in the cell.

The anode of the technetium cell, as well as the anodes of the palladium and rhodium cells, can be fabricated from any conventional electrode material resistant to attack by the electrolyte present in the respective cells and substantially inert to gaseous oxygen which may be evolved at the anode. Suitable anode materials include: noble metals, such as platinum, rhodium, iridium, and platinum-iridium alloys, carbon (graphite); and valve metals, such as titanium, tantalum, zirconium, hafnium and titanium clad copper having a coating of rhodium, platinum, iridium, platinum-iridium alloys or ruthenium oxide. By valve metal is meant a material which does not pass current when anodic but which does pass current when cathodic. Thus, any conventional electrode material which is compatible with the electrolyte in the respective electrolytic cells and which resists being solubilized during electrolysis can be used as the anode in the cells discussed herein.

The cathode of the technetium cell, as well as the cathodes of the palladium and rhodium cells, can be fabricated from any conventional electrode material that is resistant to attack by the electrolyte in the respective cells, substantially inert to gaseous hydrogen which may be evolved at the cathode and which has a high hydrogen overvoltage. By overvoltage is meant the excess voltage above the theoretical voltage that is required to reduce the element, e.g., hydrogen, to its elemental state in the same electrolyte under the conditions stated. Suitable cathode materials include titanium, tantalum, zirconium, hafnium, titanium clad copper or other valve metals and carbon (graphite). Titanium is especially useful as the cathode material.

In conducting the electrolysis of the perchloric acid solution containing technetium (most likely in the pertechnetate state) in cell 1, the cathode and anode of the technetium cell are connected to a source of direct current and an electrolyzing current is applied to the electrolyte at a substantially constant cathode potential in order to deposit metallic technetium on the cathode. The electric power fed to the cell is in amounts sufficient to cause electrolysis of the electrolyte and cause selective deposition of the technetium on the cathode.

In accordance with the present invention, the cathode potential of the technetium cell is maintained between about −0.3 to about −0.5 volts, preferably about −0.4 volts, with reference to a standard silver/silver chloride reference electrode. The upper limit of cathode potential, i.e., more negative than −0.5 volts, is not critical; however, a more negative voltage does not increase the rate of technetium deposition and, since hydrogen is liberated starting at about −0.3 volts, it is preferred to maintain the cathodic potential between the above values.

Controlled cathodic potential is achieved by utilizing a reference electrode in a salt bridge system. In such a system, the reference electrode is electrically connected to a potentiometer-controller, which operates to provide a signal to a rectifier controlling the power to the electrolytic cell. The reference electrode is also connected electrically to a sensing tip which is positioned close to the surface of the cell cathode. The reference electrode is usually positioned in a manner such that the sensing tip is approximately 2 millimeters from the working cathode. In this manner, a change in cathode potential occurring on the cathode surface is sensed by the tip of the reference electrode. That change produces a signal to be sent from the reference electrode to the controller-potentiometer which, in turn, signals the rectifier feeding power to the electrolytic cell, thereby causing an appropriate voltage adjustment, i.e., either an increase or a decrease. This control system can regulate the cathode potential to within ± 0.01 volts and is used in each of the electrolytic cells described herein. Because of the high conductivity of the electrolytes described herein, the use of low current densities, ambient temperatures and the reporting of potentials to 0.01 volt, correction for the voltage drop between the reference electrode tip and the working electrode surface is not generally necessary. The above-described equipment for controlling cathode potential is aptly described in U.S. Pat. No. 3,562,123. Such description is incorporated herein by reference.

The cathode potential at which the technetium cell (cell 1) is operated is that at which metallic technetium is selectively deposited upon the cathode. While the above-recited potential is based upon a standard silver/silver chloride reference electrode, other reference electrodes, such as a standard hydrogen electrode can be used. If such other standard electrodes are used, the numerically designated cathode potentials recited herein for each of the electrolytic cells would, of course, be different.

Hydrogen is evolved at the cathode of the technetium and rhodium cells throughout electrolysis since the cathode potential required for deposition of these metals is also sufficient to cause hydrogen evolution from the acidic solutions. In the palladium cell, hydrogen evolution is less likely because the cathode potential therein is sufficiently positive to minimize reduction of the protonic species. Evolved hydrogen from any of the cells is passed through absolute filters before venting to the atmosphere to prevent any possibility of particulate or radioactive contamination of the atmosphere.

The surface area of the cathode in each of the electrolytic cells will depend upon the volume of electrolyte processed and on the percentage of metal recovery desired in a given period of time. Thus, for a given period of electrolysis, e.g., 24 hours, a certain percentage of metal in the particular electrolyte will be deposited upon a cathode of a given surface area. Generally, it is desirable that the thickness of the metal deposit on the cathode be relatively thin in order to permit removal of the metal relatively easily and to avoid dendritic growth. Typically, sufficient cathode surface area should be provided to accommodate a metal deposit of from 0.1 to 5 mils thick at 90 percent, preferably at least 95 percent, recovery and, more desirably, at least 99 percent recovery. The surface area of the anode should match or exceed that of the cathode in order to achieve uniform deposition of the metal on the cathode.

Thus, in operating the electrolytic cells described herein at the indicated cathode potential, a cathode surface area sufficient to allow deposition of at least 90 percent, preferably at least 95 percent, and, more desirably, at least 99 percent, of the particular metal being recovered from the electrolyte subjected to electrolysis in a given period of time is used. For example, for a 68 milligram per liter concentration of technetium, 93 percent thereof can be recovered in 27 hours with a cathode surface area of 0.25 ft$^2$/gal of electrolyte at a current density of 35 amperes/ft$^2$. Generally, the current density will range from about 0.1 to about 100 amperes per square foot of cathode surface. Since the electrolysis is performed at a constant cathode potential, the voltage of the cell will be an independent variable, and the current will be a dependent variable in the current-voltage relationship. The resistance of the cell is fixed initially by the character of the cell and electrolyte an' vill increase with time. As a consequent, the curre<sub></sub> ill decrease with time. Such decrease is an indicat<sub></sub> of the depletion of the metal being recovered in the electrolyte.

The operating variables of the above-described electrolytic cells which affect deposition time, i.e., the rate of deposition, of the respective metals being recovered are the stirring or circulation of the electrolyte and the ratio of cathode surface area to electrolyte volume. A more rapid deposition rate is obtained by vigorous circulation with a given ratio of cathode surface area to electrolyte volume than with no circulation. The cathode area required is not a function of the concentration of the recoverable metal in the electrolyte but a function of the electrolyte volume and the particular cell volume required depends, in the main, on the quantity of electrolyte to be processed. Calculations based on laboratory experience indicate that each gallon of electrolyte will require about 0.5 square feet of cathode area if a depletion of 99 percent in 20 hours is acceptable. To obtain a 99.9 percent depletion in 20 hours, a minimum cathode area of about 0.75 square feet per gallon of electrolyte will be necessary. Naturally, the longer the depletion time which is acceptable, the less cathode surface area required. In another sense, the lower the desired percentage depletion for a given period of time, the less cathode surface area required.

In order to achieve good stirring or circulation of the electrolyte in the cells, each cell is typically operated in conjunction with an adjoining circulation tank between which the electrolyte is cycled. However, such operation is not necessary, i.e., the volume of the cell can be sufficient to electrolyze batchwise the amount of electrolyte generated by the present recovery process in a given period of time.

Referring once more to the flow diagram, the distillate from still B, which is a perchloric acid solution containing the volatile oxides of ruthenium and technetium, is electrolyzed in cell 1 under the controlled cathodic potential conditions and in the manner discussed hereinabove. Under such conditions, ruthenium and technetium are co-deposited on the cathode. When the electrolysis is completed, i.e., when the metal content of the electrolyte has been depleted in the amount desired, the power to the cell is turned off and the spent electrolyte (which is principally perchloric acid) is recycled to still B and from thence back to cell 1. Technetium remaining in the spent electrolyte is thereby returned to cell 1 for recovery. The amount of perchloric acid recovered by recycling the spent electrolyte to still B is approximately 96 percent of the original quantity used and, therefore, very little makeup perchloric acid is required. While only one technetium cell (cell 1) is shown in the flow diagram, it is obvious to those skilled in the art that more than one cell, in series or parallel, can be used.

The technetium and ruthenium deposited on the cathode surface of cell 1 is recovered by chemically or mechanically stripping the deposit from the cathode. In the former, the cell can be flooded with a strong mineral acid, such as nitric, hydrochloric or sulfuric acid, in amounts and concentrations sufficient to dissolve the metallic deposit from the cathode. In the latter, the metallic deposit can be stripped with a knife and the flakes recovered and dissolved in the aforementioned acids. Concentrated nitric acid is preferred. In accordance with the present process, the resulting acidic solution containing ruthenium and technetium is neutralized and made alkaline with any suitable alkaline reagent, such as sodium hydroxide or sodium carbonate, and the technetium extracted therefrom with an organic solvent by liquid-liquid extraction techniques. The organic solvent must have a high affinity or selectivity for technetium and show a favorably high distribution coefficient (organic/aqueous) for technetium relative to the alkaline aqueous medium from which the technetium is extracted. Pyridine and methyl substituted pyridines, such as the 2,3-, 2,4-, 2,5-, 2,6-, 3,4- lutidines, have been shown to be effective for extraction of technetium from aqueous solutions. The technetium is extracted into the organic phase while ruthenium remains in the aqueous phase. The extraction of technetium with pyridine and methyl substituted derivatives thereof is described in *Analytical Chemistry*, Volume 33, pages 751–754 (1961), which description is incorporated herein, in toto, by reference. The aqueous phase, which contains radioactive ruthenium, is returned to the fuel reprocessor along with the depleted PWS stream.

The organic technetium containing phase is steam distilled to remove the organic solvent and return the technetium to an aqueous phase. The steam distilled organic (pyridine) compound is relatively pure and can be re-used in the extraction step. Some of the organic solvent remains associated with the technetium in the aqueous phase since the separation is not sharp, and, if desired, this organic residue can be removed by extraction with a non-polar organic solvent, such as chloroform, benzene, hexane, or kerosene.

In one embodiment, technetium is isolated as the ammonium salt by adding an ammoniacal reagent, such as ammonia or ammonium hydroxide, to the aqueous phase resulting from the steam distillation step. The salt, $NH_4TcO_4$, is crystallized from the solution. The crystallization can be repeated several times to improve the purity of $NH_4TcO_4$, which is an article of commerce. Typically, $NH_4TcO_4$ of greater than 99 percent purity and with no detectable radiochemical contamination can be recovered in this manner. In another embodiment, the aqueous technetium containing phase can be reacidified with, for example perchloric acid or sulfuric acid and redeposited in an electrolytic cell under the same controlled cathodic potential conditions discussed above. In this manner, technetium metal instead of the salt, $NH_4TcO_4$, is recovered as the final product. Cell 1 can be re-used to perform this subsequent electrolysis or a further similar electrolytic cell can be provided.

In a typical embodiment, following deposition of the ruthenium and technetium on the cathode, the spent electrolyte liquor is removed from the cell and recycled to still B, and the cell washed twice with a volume of water, usually distilled water, equal to the volume of the cell in order to remove residual traces of electrolyte. Thereafter, and as shown in the flow diagram, sulfuric acid is added to the cell to dissolve the deposit on the cathode. The sulfuric acid solution is withdrawn from the cell into a suitable tank where the solution is neutralized and made slightly alkaline with sodium hydroxide. Lutidine (2,4-dimethylpyridine) is added to the alkaline solution in quantities sufficient to extract substantially all of the technetium therein and the resulting organic phase separated from the aqueous phase and steam distilled. Ammonia is introduced into aqueous phase remaining from the steam distillation to form ammonium pertechnetate, which is crystallized from the solution and recovered.

Alternatively, the aqueous phase from the steam distillation is acidified with sulfuric acid and this solution returned to cell 1 where technetium is redeposited on the cathode. The cathode is stripped of technetium metal following completion of the electrolysis and the metal flakes ground and sold as technetium powder.

The radioactivity of the technetium recovered in the above-described manner, which is mainly the isotope technetium 99, is low. This technetium is a weak betae-mitter with a half life of about $2 \times 10^5$ years. Unpublished studies at Brigham Young University performed under the auspices of the United States Atomic Energy Commission indicate that such technetium is useful as a petroleum reforming catalyst.

Turning again to the flow diagram, the bottoms from still B, which is a sulfuric acid solution of palladium and rhodium, is forwarded to electrolytic cell 2, i.e., the palladium cell, where the palladium present therein is cathodically deposited at a controlled cathode potential. Typically, the bottoms is diluted with water to about three times its volume before being introduced into the palladium cell. Preferably, the concentration of sulfuric acid in the palladium cell is maintained below about 40 weight percent for the reason that above 40 percent sulfuric acid, redissolution of metals plated onto the cathode occurs. Below from 30 to 40 percent by weight sulfuric acid, no significant advantage is obtained; however, it is preferred to maintain the concentration between about 20 and 25 percent for the electrolysis.

The construction and operation of the palladium cell is essentially the same as that described above with respect to the technetium cell. The anode and cathode materials described with respect to the technetium cell can also be employed in the palladium cell. Titanium cathodes are preferably used in the palladium cell.

In the operation of the palladium cell, the cathode theeof is controlled at a potential of from +0.1 to -0.05 volt versus a standard silver/silver chloride reference electrode. Preferably, the cathode is maintained at a potential of +0.05 volt. In the controlled cathodic potential electrolysis of palladium, no hydrogen is usually evolved since the cathode potential is sufficiently positive with respect to the potential at which hydrogen evolution commences.

After substantial depletion of the palladium present in the electrolyte of cell 2 (normally about 99 weight percent of the palladium is removed), the depleted liquor from the palladium cell is removed and forwarded to an electrolytic cell (cell 3) where the rhodium present in the depleted liquor is selectively cathodically deposited.

The palladium deposited upon the cathode of cell 2 can be recovered by one of several methods. For example, the cathode can be removed from the cell, water washed and the palladium mechanically stripped. The flakes of palladium thereby obtained can be consolidated by melting in a furnace for recovery of solid metallic palladium or the flakes can be ground and recovered as a powder. Alternatively, the palladium flakes can be redissolved in nitric or sulfuric acid for replating in order to further refine the palladium metal product. In another embodiment, and as illustrated in the accompanying flow diagram, the palladium deposit is redissolved in nitric acid that is introduced into the cell, and the nitric acid solution of palladium is forwarded to a further electrolytic cell (cell 4) where a second plating at the same controlled cathodic potential as recited above is performed. The palladium deposits from this cell are mechanically stripped from the cathode and consolidated by melting. Naturally, the same cell, i.e., cell 2, can be used also to refine the palladium. The spent liquor and wash water from palladium cell 4 can be recycled (not shown) to still A.

The palladium recovered from a reprocessed uranium fuel waste stream is believed to contain a small amount of the palladium $^{107}$ isotope, which is a weak beta-emitter. It also contains a small amount of cesium $^{137}$, which is the principal radioactive contaminant, and a trace amount of cobalt $^{60}$. However, the radioactivity of the palladium recovered is very low and can be used in the form recovered without shielding. The radioactivity of the palladium metal recovered can be still further decreased by a second sequential cathodic electrodeposition of the palladium in accordance with the present description. By this means, the activity of the resulting palladium is reduced from about 40 microcuries per gram to about one microcurie per gram, based on a cesium $^{137}$ standard. The utility of palladium as a catalyst is well known.

As indicated above, the electrolyte from cell 2, which is substantially depleted of palladium but which yet contains rhodium is forwarded to cell 3, i.e., the rhodium cell, which can be the same electrolytic cell as palladium cell 2 or, as shown in the flow diagram, a different electrolytic cell. The construction and operation of the rhodium cell is essentially the same as that described with respect to the palladium and technetium cells hereinabove. The anodes and cathodes that can be used in the rhodium cell are the same as those described for the palladium and technetium cell. In addition to the cathode materials described with respect to the palladium and technetium cells, rhodium or iridium are especially useful as cathode materials for the rhodium cell. Further, the cathode for the rhodium cell should be resistant to nitric acid.

A difficulty arising from the use of titanium cathodes in the rhodium cell is that the rhodium deposited thereon tends to alloy with the titanium and, when the rhodium is removed from the cathode by, for example, immersing the cathode in nitric acid, a portion of the cathode is also removed. In order to avoid the problem of dissolving a portion of the cathode when removing deposited rhodium therefrom, it has been discovered that if the cathode is given a flash coating of a metal, such as copper, and the rhodium deposited thereupon, the rhodium can be easily removed by contacting the cathode with dilute nitric acid. Thus, the nitric acid dissolves the undercoating of copper forming copper nitrate, thereby causing the rhodium deposit to flake off. Metals that can be used as a flash coating on the cathode of the rhodium cell are those metals that are easily dissolved by nitric acid, preferably dilute nitric acid, and which can be electrolytically deposited on the cathode easily. Besides copper, there can be mentioned lead, cadmium, tin, palladium, silver, chromium and nickel.

The potential at which rhodium is selectively and controllably deposited upon the cathode can vary from $-0.05$ to $-0.5$ volt with respect to a standard silver/silver chloride reference electrode. Preferably, the cathode potential is controlled at from about $-0.2$ to about $-0.3$ volt with reference to the silver/silver chloride reference electrode. The upper limit of cathode potential, i.e., more negative than $-0.5$ volt, is not critical; however, a more negative voltage does not increase the rate of deposition and, since hydrogen is liberated starting at about $-0.3$ volt, it is preferred to maintain the cathodic potential at between $-0.2$ and $-0.3$ volt to thereby minimize hydrogen evolution. Hydrogen evolved from the rhodium cell is passed to an absolute filter before discharge to the environment to avoid the passage of any particulate matter into the atmosphere and to prevent radioactive material from escaping into the atmosphere.

Generally, it is not economical to operate the palladium electrolytic cell until all of the palladium has been removed from the electrolyte. Therefore, the first deposits occurring in the rhodium cell will normally contain the remaining amount of palladium that is present in the depleted liquor withdrawn from cell 2 and forwarded to the rhodium cell. If desired, electrolytic deposition in the rhodium cell can be halted following deposition of the remaining palladium and this deposit removed and recycled to the palladium cell or to still A.

Following depletion of the rhodium content in the electrolyte in the rhodium cell, the spent electrolyte is recycled to the eluate tank or, as shown, to still A and the cell washed with water which is also recycled to the same point (s). Thereafter, as shown by the flow diagram, the cell is flooded with nitric acid and the flash coating of copper on the cathode dissolved. The contents of the cell are withdrawn and filtered; the cell is washed with water and the wash water used to wash the rhodium metal retained on the filer. The rhodium metal retained on the filter can be consolidated by melting and used. The copper nitrate-nitric acid filtrate is recycled to the cell where an electrolyzing current is applied to replate the cathode with a flash coating of copper. Suitably, the cathode is maintained at a potential of from about +0.1 to about −0.5 volt versus the silver/silver chloride reference electrode in order to accomplish the reapplication of the flash coating of copper. The conditions at which the copper is replated on the cathode are not critical. Typically, a suitable flash coating of copper from a 0.1N copper nitrate solution can be achieved in about ten minutes at a current density of about 50 amperes per square foot of cathode surface area. The solution remaining in the cell is withdrawn from the cell to the nitric acid storage tank, the contents of which are used to strip the flash coating of copper from the cathode in the next cycle. This technique of using a flash coating of copper on the cathode is useful for recovering rhodium because of the resistance of rhodium to nitric acid. The rhodium recovered by this method can be quantitative.

Rhodium recovered from waste streams produced by reprocessing irradiated nuclear fuels, such as Purex waste feed, will contain small quantities of the radioactive ruthenium $^{106}$ isotope which has about a 1 year half-life. It may also contain the rhodium $^{102}$ isotope having a 210 day half life. This radioactivity may restrict somewhat its commercial use. However, preliminary studies supported by the United States Atomic Energy Commission indicate that its use as an ammonia synthesis catalyst would be acceptable.

While the present description is directed to the separation of palladium, rhodium and technetium values from aqueous alkaline solutions of fission products, it is obvious that the techniques described herein can be used to separate and recover only one or more but less than all of these materials. For example, if palladium alone is desired, the techniques of adsorption, desorption and controlled cathodic electrolysis can be used to separate only palladium. The same can be said for technetium and rhodium. In any case, the materials not separated can be returned to the fuel reprocessor with the anion exchange effluent.

It should be noted, however, that ruthenium is deposited cathodically at a potential more positive than palladium. With reference to the standard silver/silver chloride reference electrode, ruthenium starts to deposit at about +0.4 volt. Since ruthenium values in fission product wastes are generally radioactive, the palladium, rhodium and technetium recovered at the more negative cathode potentials described above will contain ruthenium and may be radioactive unless the ruthenium is first removed. Such radioactive contamination would, of course, restrict the commercial use of these materials.

Like technetium oxide, ruthenium oxide is volatile and by taking advantage of this property, the ruthenium values in the eluate can be removed and returned to the fuel reprocessor for burial. It is most likely that the ruthenium present in the eluate is already in its highest valence state and, therefore, the use of an oxidizing agent (as in the separation of technetium) can be eliminated. Thus, by distilling the eluate at temperatures sufficient to volatilize ruthenium oxide, palladium and rhodium could be recovered without substantial quantities of ruthenium. Naturally, such a distillation would also remove technetium oxide. If technetium is to be recovered the liquid-liquid extraction techniques described hereinbefore can be used to separate the ruthenium from the technetium.

In a typical embodiment of the present invention, aged alkaline Purex waste (PWS) from the United States Atomic Energy Commission installation at Hanford, Wash. is passed through an anion exchange column at a feed rate of from 7 to 12 bed volumes per hour and palladium, rhodium, ruthenium and technetium metal values present therein loaded onto the resin. The depleted Purex waste stream is returned to Hanford, Washington. The nominal composition of such PWS feed is: sodium nitrite — 2 molar; sodium carbonate — 1 molar, sodium nitrate — 0.5 molar, sodium sulfate — 0.3 molar, technetium — 20 milligrams per liter, rhodium — 8 milligrams per liter, and palladium — 8 milligrams per liter. About 94 percent of the rhodium, 93 percent of the palladium and 83 percent of the technetium contained in the PWS feed is retained on the column. The anion exchange column is washed with distilled water and dilute, i.e., 0.25–0.1 molar, nitric acid.

The metal values adsorbed on the column are eluted by passing through the column in succession, increasing concentrations of nitric acid, e.g., concentrations ranging from 3 molar to 8 molar, followed by a washing with distilled water. Approximately 88 percent of the rhodium, 89 percent of the palladium and 75 percent of the technetium adsorbed by the column is eluted therefrom by the nitric acid elution.

The bulk of the water in the eluate is removed by an atmospheric distillation at a head temperature of about 100° C. Thereafter, sulfuric acid is added to the distillation column and the temperature of the still pot raised to distill nitric acid. The nitric acid distillate is re-used to further eluate the anion exchange column when it is reloaded. Perchloric acid is added to the sulfuric acid still bottoms and the ruthenium and technetium present therein distilled as volatile oxides. The overhead from this distillation is condensed and the distillate electrolyzed in a cell with titanium cathodes and platinized titanium anodes at a cathodic potential of −0.4 volt versus a standard silver/silver chloride reference electrode. The technetium and ruthenium deposited on the cathode is removed by dissolving the deposit with concentrated sulfuric acid. The resulting sulfuric acid solution is neutralized and made alkaline with sodium hydroxide. The technetium values present in this alkaline solution are extracted with lutidine and the lutidine extract steam distilled. The technetium values in the aqueous phase resulting from the steam distillation is mixed with ammonia to form ammonium pertechnetate which is recovered by crystallization from the solution.

The sulfuric acid solution remaining in the second distillation column, i.e., the bottoms containing the palladium and rhodium values remaining after the perchloric acid distillation, is electrolyzed in a cell with titanium cathodes and platinized titanium anodes at a cathode potential of +0.04 volt versus a standard silver/silver chloride reference electrode to deposit palladium on the cathode. The palladium depleted sulfuric acid solution is then electrolyzed in a further electrolytic cell with a copper coated titanium cathode and a platinized titanium anode at a cathode potential of from −0.2 to −0.3 volt with reference to a standard silver/silver chloride reference electrode to deposit rhodium on the cathode. In both cases, the electrolyzing current is sufficient to cause deposition of the respective metals on the cathode of the electrolytic cell.

The palladium deposit is dissolved from the titanium cathode with nitric acid and cathodically redeposited by a second electrodeposition at controlled cathode potentials. These deposits are washed off the titanium cathode and collected as a metal powder. The rhodium deposits are removed from the cathode by immersing the cathode in nitric acid and dissolving the copper substrate. The rhodium deposits are recovered by filtration and consolidated by melting.

The present process is more particularly described in the following example which is intended as illustrative only since numerous modifications and variations therein will be apparent to those skilled in the art.

EXAMPLE

Eighteen hundred milliliters of aged alkaline Purex waste stream from the United States Atomic Energy Commission installation at Hanford, Wash. are passed sequentially through two twelve milliliter anion exchange columns packed with Amberlite IRA-938, a macroreticular anion exchange resin available from Rohm & Haas Co., at a flow rate of 3 to 5 milliliters per minute. The feed stream contained 32 milligrams of palladium, 29 milligrams of rhodium, 22 milligrams of ruthenium and 52 grams of technetium. After the 1800 milliliter charge of Purex feed had passed through both columns, the two columns were washed separately with two bed volumes (BV) of 0.1 molar nitric acid and one BV of 0.25 molar nitric acid. The columns were then each elluted sequentially with two BV of 3.0 molar (M) nitric acid ($HNO_3$), nine BV of 6.0 M $HNO_3$, one BV of 8.0 M $HNO_3$ and one BV of distilled water. The eluants from the two columns were combined and 10 milliliters of concentrated sulfuric acid added to it. The resulting solution was distilled to remove water and nitric acid sequentially. The pot residue was transferred to a second distillation flask and 15 milliliters of 70 percent perchloric acid were added. The perchloric acid was distilled from the distilling flask until sulfur trioxide ($SO_3$) fumes began to appear. The distillation was stopped and the pot contents were allowed to cool. An additional 15 milliliters of 70 percent perchloric acid were added and the distillation was repeated.

The contents of the distilling flask were washed into a beaker and diluted to about 100 milliliters. Palladium was deposited from this solution on a platinum cathode by electrolysis at a cathodic potential of −0.04 volt versus a standard silver/silver chloride reference electrode. The anode of the laboratory electrolytic cell was platinum. Upon completion of the palladium deposition, the platinum cathode was removed and a copper plated platinum cathode substituted therefor. The cathode voltage was then changed to −0.31 volt versus the silver/silver chloride reference electrode and the rhodium was deposited on the cathode. The combined perchloric acid distillates were charged to an electrolytic cell wherein technetium and ruthenium are deposited upon a titanium cathode at a controlled cathodic potential of −0.4 volt versus the silver/silver chloride reference electrode. The anode of this laboratory cell was also platinum.

The silver/silver chloride reference electrode was a sleeve type electrode manufactured by the Fisher Scientific Company. The potentiometer-controller was a Leeds Northrup Speed-o-Max Recorder-Controller, type H, model S. The rectifier used to provide power to the cell consisted of the combination of a silicon control rectifier (SCR) manufactured by the Barber Coleman Co., model No. 622B-12060-024, and an ATR model 620C-Elit (manufactured by the ATR Mfg. Co.) rectifier connected in series therewith. This instrumentation was capable of controlling the cathode potential of the cells to ± 0.01 volt.

The above example demonstrates that rhodium, palladium, and technetium can be recovered from aged alkaline radioactive waste streams.

Although the present process has been described with reference to specific details of certain embodiments thereof, it is not intended that such details be regarded as limitations upon the scope of the invention, except as and to the extent they are included in the accompanying claims.

We claim:

1. A process for separating palladium, rhodium and technetium values from an alkaline aqueous solution containing said metal values in the form of anions, as well as other fission product metal values, said aqueous solution resulting from processing irradiated nuclear fuel, which comprises, in combination, the steps of:
    a. contacting the alkaline aqueous solution with an anion exchange resin to adsorb palladium, rhodium and technetium values thereon;
    b. eluting adsorbed palladium, rhodium and technetium values from the anion exchange resin whereby to obtain an eluate containing the eluted metal values;
    c. separating technetium as its volatile oxide from an aqueous solution containing the eluted metal values while retaining eluted palladium and rhodium values in said solution and collecting the thus separated technetium oxide;
    d. subjecting an acidic solution of the collected technetium to an electrolyzing current under controlled cathodic potential conditions sufficient to deposit technetium on the cathode;
    e. subjecting a substantially technetium free acidic solution of the eluted palladium and rhodium values to an electrolyzing current under controlled cathodic potential conditions sufficient to deposit palladium on the cathode but insufficient to deposit thereon any substantial quantity of rhodium; and
    f. subjecting the palladium depleted solution of step (e) to an electrolyzing current under controlled cathodic potential conditions sufficient to deposit rhodium on the cathode.

2. The process according to claim 1 wherein the alkaline aqueous solution is a Purex alkaline waste stream.

3. A process according to claim 1 wherein the adsorbed palladium, rhodium and technetium values are eluted from the anion removal material with nitric acid, perchloric acid, sodium perchlorate, ammonium hydroxide, sodium hydroxide, ammonium thiocyanate or mixtures thereof.

4. A process according to claim 1 wherein technetium is separated from the solution containing eluted metal values by oxidizing technetium therein to its pertechnetate state and distilling the technetium from the solution as a volatile oxide.

5. A process according to claim 4 wherein the technetium is oxidized with perchloric acid.

6. A process according to claim 1 wherein the acidic solution of the separated technetium oxide is electrolyzed at a cathodic potential of between about −0.3 and about −0.5 volt with reference to a sandard silver/silver chloride reference electrode.

7. A method according to claim 1 wherein a sulfuric acid solution of eluted palladium and rhodium values is electrolyzed at a cathode potential of from about +0.1 to about −0.05 volt with reference to a standard silver/silver chloride reference electrode to deposit palladium on the cathode and the resulting palladium depleted solution is electrolyzed at a cathode potential of from about −0.05 to about −0.5 volt with reference to a standard silver/silver chloride reference electrode to deposit cathodically rhodium.

8. A process for separating palladium, rhodium and technetium values from an alkaline aqueous solution containing said metal values in the form of anions and other fission product metal values, said aqueous solution resulting from processing irradiated nuclear fuel, which comprises, in combination, the steps of:
   a. contacting the alkaline aqueous solution with an anion exchange resin to adsorb palladium, rhodium and technetium values thereon;
   b. eluting adsorbed palladium, rhodium and technetium values from the anion exchange resin whereby to obtain an eluate containing the eluted metal values;
   c. adding sulfuric acid to said eluate to form a sulfuric acid solution of the eluted metal values;
   d. oxidizing and then separating technetium from the sulfuric acid solution as a volatile oxide while retaining palladium and rhodium values in the sulfuric acid solution and collecting the thus separated technetium oxide;
   e. subjecting an acidic solution of the collected technetium to an electrolyzing current under controlled cathodic potential conditions sufficient to deposit technetium on the cathode;
   f. subjecting a substantially technetium free acidic solution of the eluted palladium and rhodium values to an electrolyzing current under controlled cathodic potential conditions sufficient to deposit palladium on the cathode but insufficient to deposit thereon any substantial quantity of rhodium; and
   g. subjecting the palladium depleted solution of step (f) to an electrolyzing current under controlled cathodic potential conditions sufficient to deposit rhodium on the cathode.

9. The process according to claim 8 wherein the alkaline aqueous solution containing palladium, rhodium and technetium values is an aged Purex alkaline waste stream.

10. A process according to claim 8 wherein the adsorbed palladium, rhodium and technetium values are eluted from the anion removal material with nitric acid, perchloric acid, sodium perchlorate, ammonium hydroxide, sodium hydroxide, ammonium thiocyanate or mixtures thereof.

11. A process according to claim 8 wherein the technetium in the sulfuric acid solution of eluted metal values is oxidized with perchloric acid and the acidic solution of separated technetium is a perchloric acid solution.

12. A process for separating technetium values from alkaline aqueous solutions containing same in an anionic form and other fission product metal values, said aqueous solution resulting from processing irradiated nuclear fuel, which comprises, in combination, the steps of:
   a. contacting the alkaline aqueous solution with an anion exchange resin to adsorb technetium values thereon;
   b. eluting adsorbed technetium values from the anion exchange resin whereby to obtain an eluate containing eluted technetium values;
   c. separating technetium as a volatile oxide from a solution containing the eluted technetium values and collecting the thus separated technetium oxide; and
   d. subjecting an acidic solution of the collected technetium to an electrolyzing current under controlled cathodic potential conditions sufficient to deposit technetium on the cathode.

13. A process according to claim 12 wherein ruthenium is co-deposited with the technetium on the cathode.

14. A process according to claim 13 wherein the deposit of technetium and ruthenium is dissolved in a strong mineral acid to form an acid solution of technetium and ruthenium, the acid solution is made alkaline with an alkaline reagent, technetium values are extracted from the alkaline solution with an organic solvent having an affinity for technetium, and technetium values are separated from the organic solvent.

15. A process according to claim 14 wherein the organic solvent is pyridine or dimethyl substituted pyridine derivatives.

16. A process according to claim 14 wherein technetium values are separated from the organic solvent by steam distillation and the resulting aqueous phase containing technetium is treated with an ammoniacal reagent to form ammonium pertechnetate.

17. A process according to claim 14 wherein technetium values are separated from the organic solvent by steam distillation and the resulting aqueous phase containing technetium acidified and subjected to an electrolyzing current under controlled cathodic potential conditions sufficient to deposit technetium on the cathode.

18. A process according to claim 17 wherein the cathode potential is controlled between about −0.3 and about −0.5 volt with reference to a standard silver/silver chloride reference electrode.

* * * * *